No. 737,783. PATENTED SEPT. 1, 1903.
A. SCHYIA.
CHOPPING MACHINE.
APPLICATION FILED NOV. 26, 1902.
NO MODEL.

Witnesses:

Arnold Schyia,
Inventor
per Attorney

No. 737,783. Patented September 1, 1903.

UNITED STATES PATENT OFFICE.

ARNOLD SCHYIA, OF NEUSALZ-ON-THE-ODER, GERMANY, ASSIGNOR TO THE FIRM OF EISENHÜTTEN UND EMAILLIRWERK, OF NEUSALZ-ON-THE-ODER, PRUSSIA, GERMANY.

CHOPPING-MACHINE.

SPECIFICATION forming part of Letters Patent No. 737,783, dated September 1, 1903.

Application filed November 26, 1902. Serial No. 132,962. (No model.)

*To all whom it may concern:*

Be it known that I, ARNOLD SCHYIA, a subject of the King of Prussia, German Emperor, residing at the city of Neusalz-on-the-Oder, in the Kingdom of Prussia, German Empire, have invented certain new and useful Improvements in Chopping-Machines; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to improvements in chopping-machines in which the meat or the other material being minced is forced through a perforated disk by means of a worm and rotating cutter.

In my machine the rear bearing for the worm is constructed in two separate parts. The outer member is provided with a screw-thread of high pitch, so that the part may be adjusted axially in the similarly-threaded casing. The inner member of the bearing, on the other hand, is rounded and fits into the correspondingly-formed interior of the outer member. The perforated disk is provided with a bearing-ring fitting to the casing, the contacting parts presenting a rounded surface for the purpose of insuring a uniformly tight joint, while admitting of immediate separation of the parts and removal of the worm.

My invention consists in the combination of a bearing member axially adjustable in the casing of the machine with a worm provided with a rounded friction-surface.

My improvement is illustrated by the appended drawings, in which—

Figure 1:
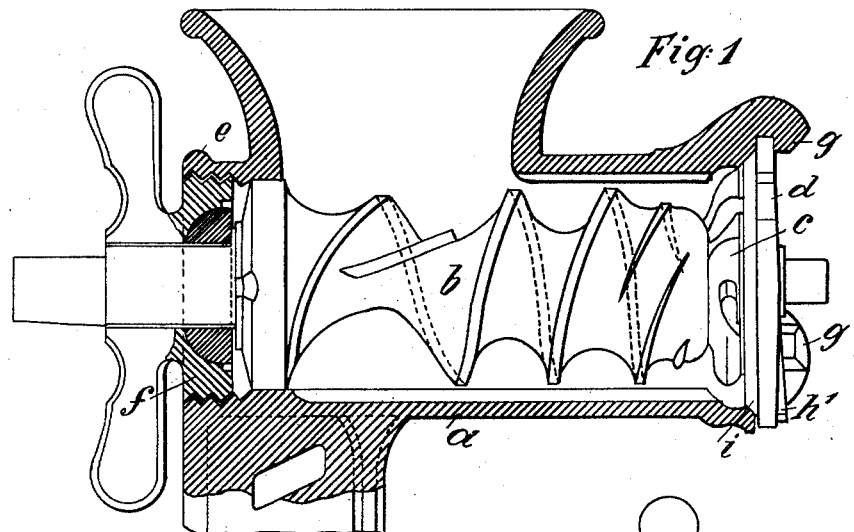
Figure 2:
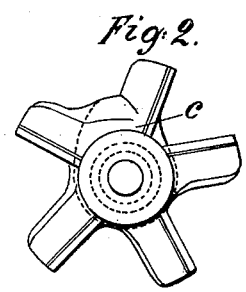
Figure 3:
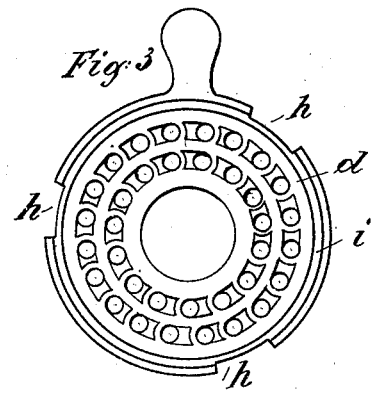
Figure 4:
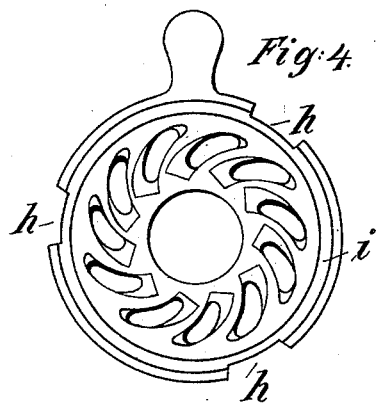

Figure 1 is a longitudinal section, the worm, cutter, and perforated disk being shown in elevation. Fig. 2 shows the cutter in end elevation. Fig. 3 is a similar view of the perforated disk. Fig. 4 is a like view of a modified form of such disk.

The machine consists of a casing $a$, worm $b$, cutter $c$, and perforated disk $d$. The rear end of the worm is provided with a rounded part $f'$, forming a friction-surface. The outer member $f$, which receives the part $f'$, is provided with a screw-thread. The casing $a$ has the form of a cylinder open at both ends and provided with a hopper. At the rear end it is internally screwed at $e$ with about three threads to the inch, so that it may receive the threaded bearing $f$. The front end of the worm-shaft is mounted in the perforated disk $d$, which is carried by the three projections $g\ g\ g$ of the casing. The disk is provided with three peripheral slots $h\ h\ h$, whereby it can be pushed over the projections $g\ g\ g$, whereupon it is turned so that the wedge-shaped surfaces $h'\ h'\ h'$ come below the projections $g\ g\ g$, thus preventing retreat of the disk. The disk $d$ is provided with a ring $i$, having a rounded or conical surface fitting a conical surface in the casing $a$. In this manner a permanently tight joint is made between disk and casing, the rounded surface admitting of slight ball movement of the disk at the joint. Thus if one of the projections $g$ lies somewhat lower than the others the rounded surface $i$ at this part will retreat from the conical surface to a certain extent. At the other parts, on the contrary, the ring $i$ will advance somewhat farther into the casing—that is to say, the disk automatically assumes that position in which it lies against all three projections $g\ g\ g$. From this it will be clear that whatever the position of the disk the rounded surface $i$ always insures a perfectly tight joint. At the other end of the casing the parts $f$ and $f'$, owing to their rounded surfaces admitting of free movement, insure correct position of the worm relatively to the disk $d$. The cutter $c$ will therefore rotate with perfectly uniform motion.

To take the machine to pieces, it is only necessary to twist the disk $d$ until the slots $h\ h\ h$ coincide in position with the projections $g\ g\ g$, when the disk can be drawn off. The part $f$ at the opposite end has simply to be unscrewed.

Having thus described my invention, what I claim as new, and desire to secure by Letters Patent, is—

1. In a food-chopping machine, the combination with an open-ended tubular casing of uniform diameter having a thread formed in one end, and a conical bearing-surface at the other, a threaded end plate closing the threaded end of the casing and having a socket, a feed-screw in the casing having a ball thereon to fit said socket, a perforated plate at the other end of the casing having a conical bearing-face to fit the conical bearing-surface, a cutter mounted at the end of the screw and coöperating with the perforated plate, substantially as described.

2. In a food-chopping machine, the combination with an open-ended tubular casing of uniform diameter having a thread formed in one end and a conical bearing-surface at the other, a threaded end plate closing the threaded end of the casing and having a socket, projections on the other end of the casing having internal grooves cut therein, a perforated plate having cut-away portions to register with the projections and wedge-shaped surfaces to engage a side of the groove in the projection, a feed-screw, a ball-shaped element on the screw to fit said socket, said feed-screw mounted in the end plates and a cutter mounted at the end of the screw to coöperate with the perforated plate, substantially as described.

In testimony that I claim the foregoing as my invention I have signed my name in presence of two subscribing witnesses.

ARNOLD SCHYIA.

Witnesses:
HENRY HASPER,
WOLDEMAR HAUPT.